Patented Apr. 23, 1929.

1,710,617

UNITED STATES PATENT OFFICE.

WALTER HADDON, OF LONDON, AND JAMES McDONALD BURNETT, OF WESTON-BY-WELLAND, ENGLAND.

PASTED ACCUMULATOR GRID OR PLATE.

No Drawing. Application filed April 14, 1927, Serial No. 183,898, and in Great Britain April 19, 1926.

This invention relates to accumulator grids or plates of the pasted type and has for its object to provide a simple and effective means for ensuring that the lead oxide paste shall not fall away from the grid while at the same time leaving facilities for the acid or electrolyte to circulate in contact with the plate or grid.

According to the invention we apply to the made plate or grid after it has been pasted and so as to be integral with it, a highly flexible coating or skin having a porous structure. That is to say a skin which covers the plate is firmly fixed to it but is capable of stretching without rupture as the plate grows or changes its form. This is effected, according to our invention, by applying to the pasted plates or grids either before or after formation a coating consisting of rubber latex in admixture with a salt soluble in water.

The mixture after application to the plates or grids is allowed to dry and the soluble salt is washed out leaving a spongy or cellular structure covering the faces of the plate or grid and serving to return the paste in position while still permitting access of the electrolyte or acid to the plates or grids.

Alternatively the latex for example may be mixed with water to such an extent that on coagulating by heat or acid the skin or rubber become porous while firmly adhering to the plate.

Further a chemical, preferably of an alkaline nature soluble in water, may be mixed with the latex so that on the application of heat or acid bubbles of gas are formed which break through the rubber skin to form a porous structure of which the porosity can be regulated by the quantity of the chemical used.

One convenient chemical which may be used for this purpose is ammonia carbonate. If desirable there may also be added a chemical or chemicals, such as alkaline sulphides to produce a partial vulcanization of the porous rubber covering when the plate is dried.

What we claim and desire to secure by Letters Patent:—

A process for treating pasted accumulator plates according to which the pasted plate is coated with a mixture composed of rubber latex in admixture with a soluble salt, is then allowed to dry and the soluble salt is then washed out leaving an elastic and porous structure.

In witness whereof we affix our signatures.

WALTER HADDON.
JAMES McDONALD BURNETT.